Feb. 14, 1950             F. BARON                  2,497,338
MEANS FOR AUTOMATICALLY AND PROGRESSIVELY
REGULATING VEHICLE SPEED
Filed March 13, 1946                         7 Sheets-Sheet 1
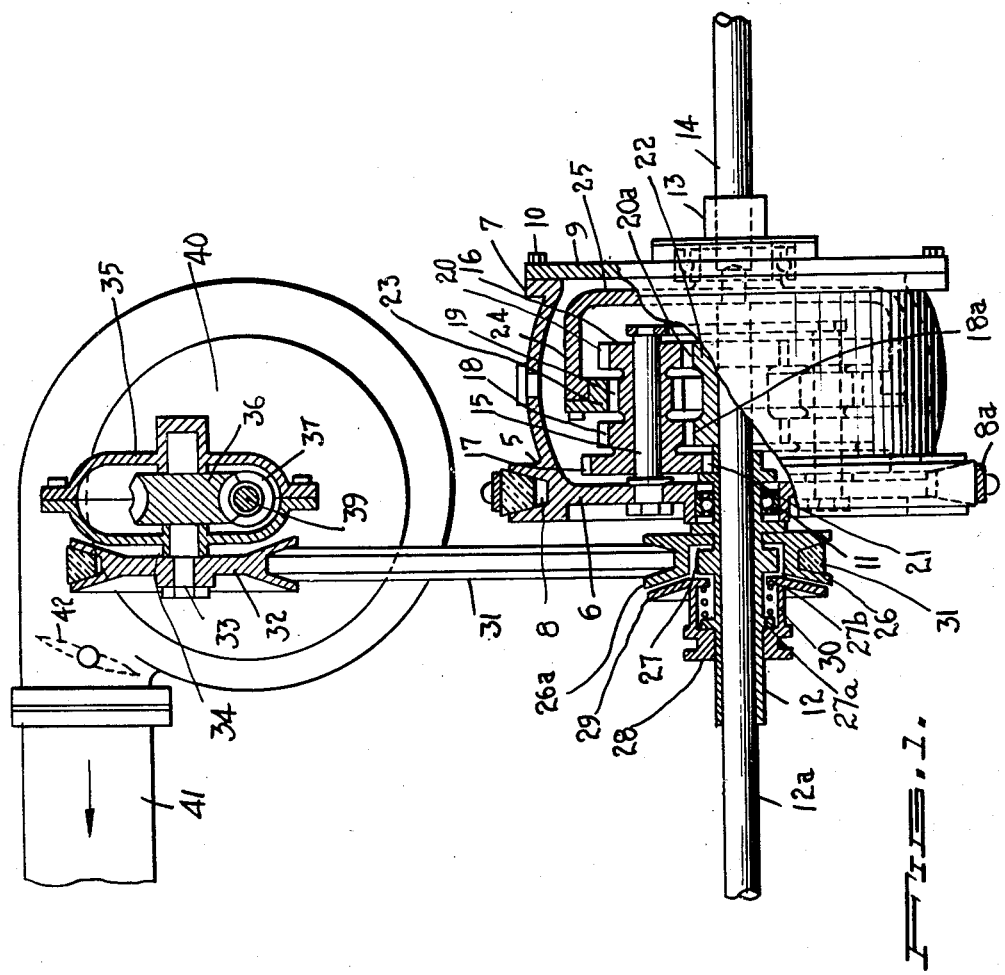
INVENTOR.
FLORY BARON
BY
Carl Miller
ATTORNEY.

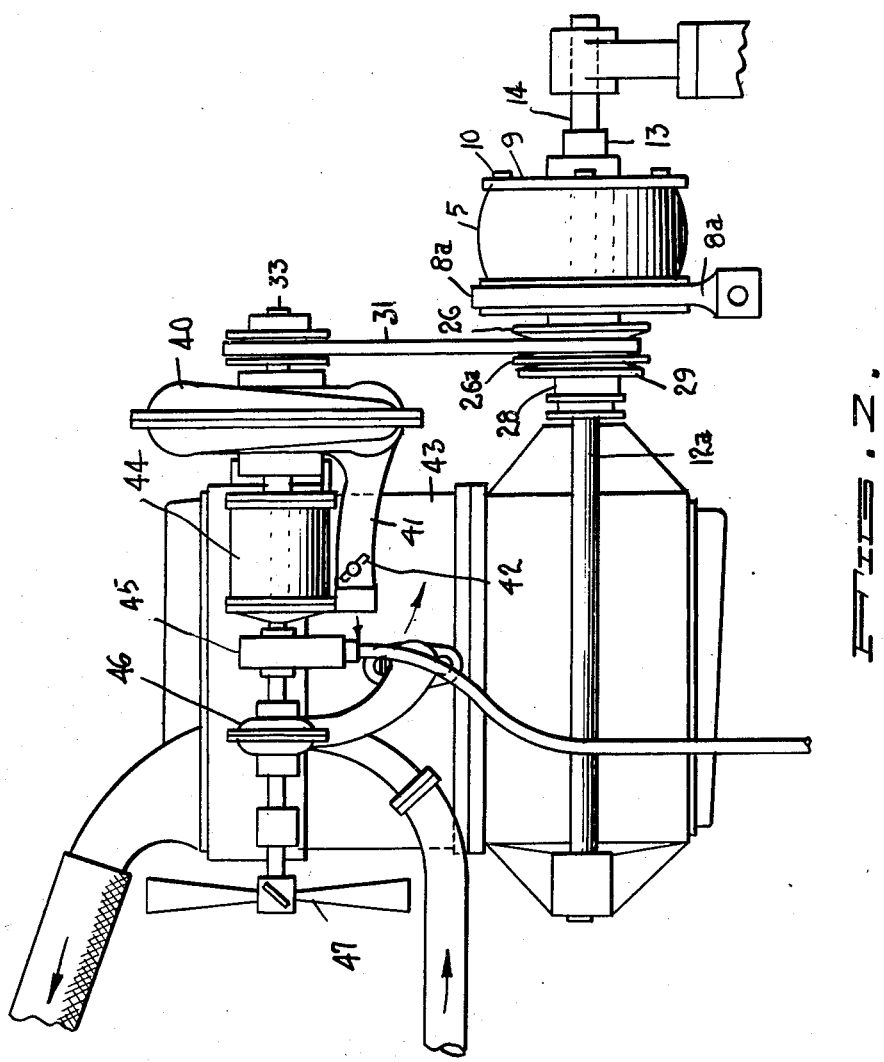

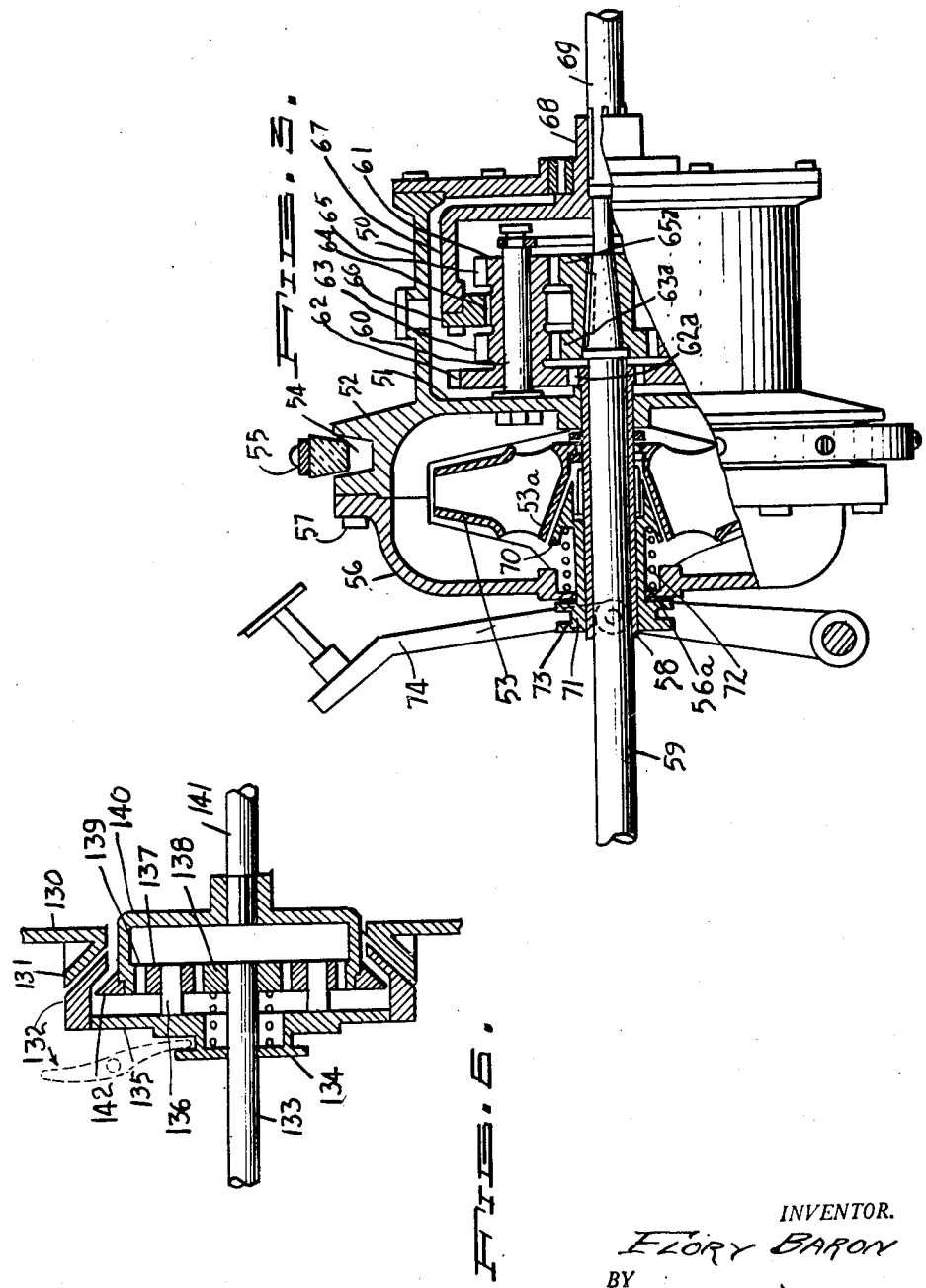

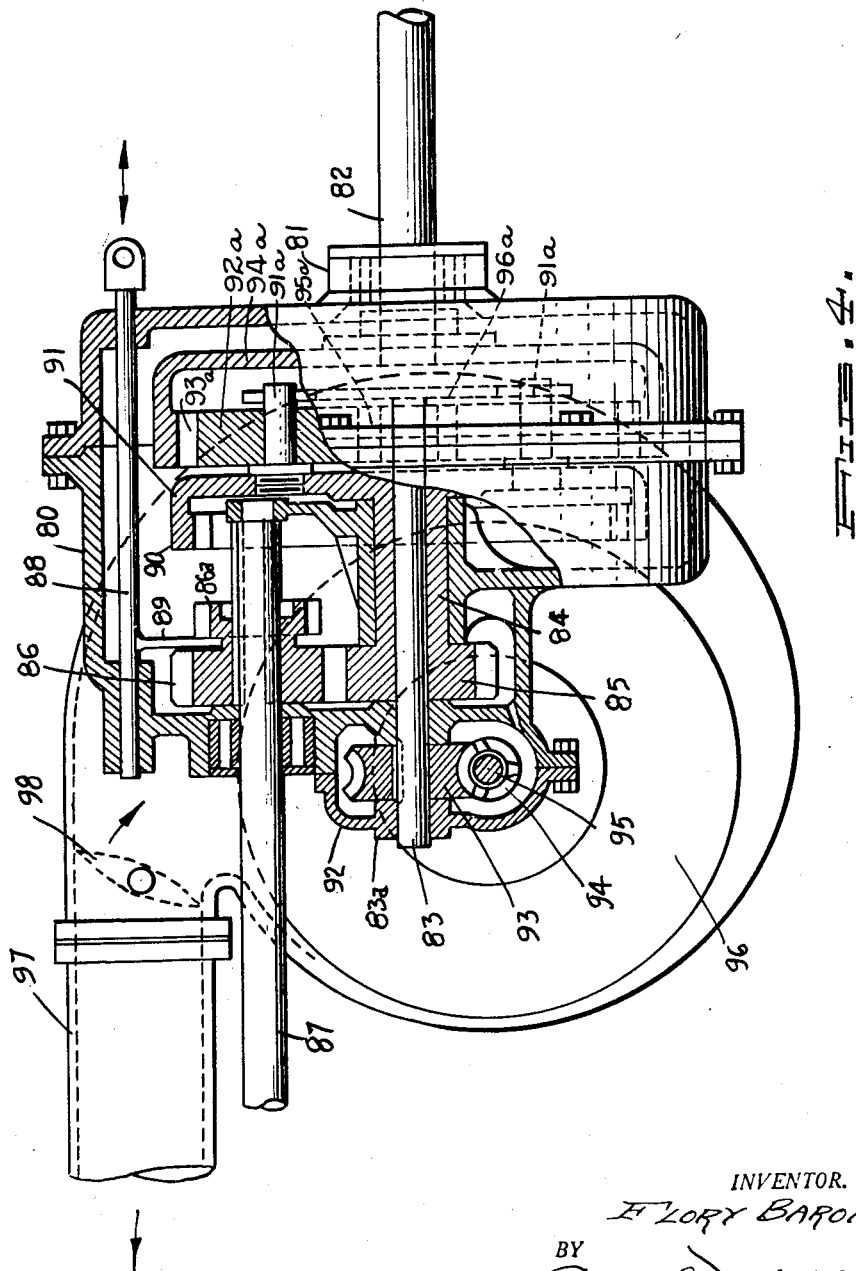

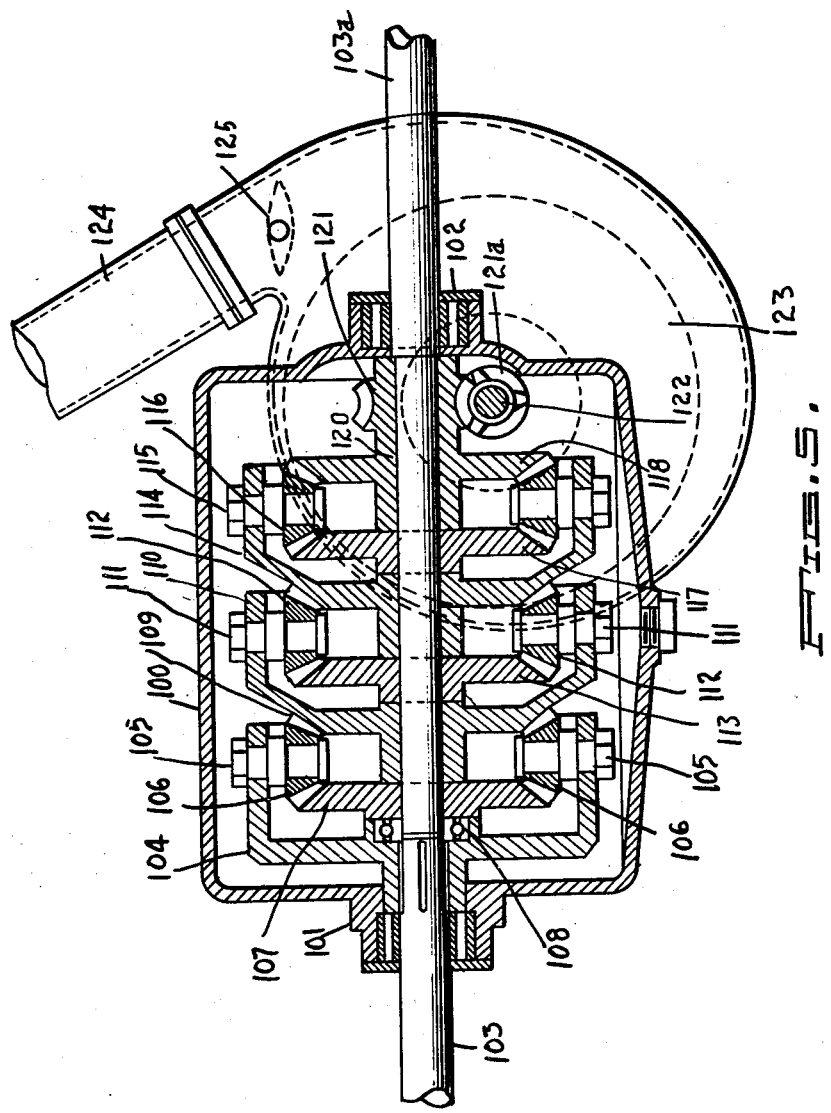

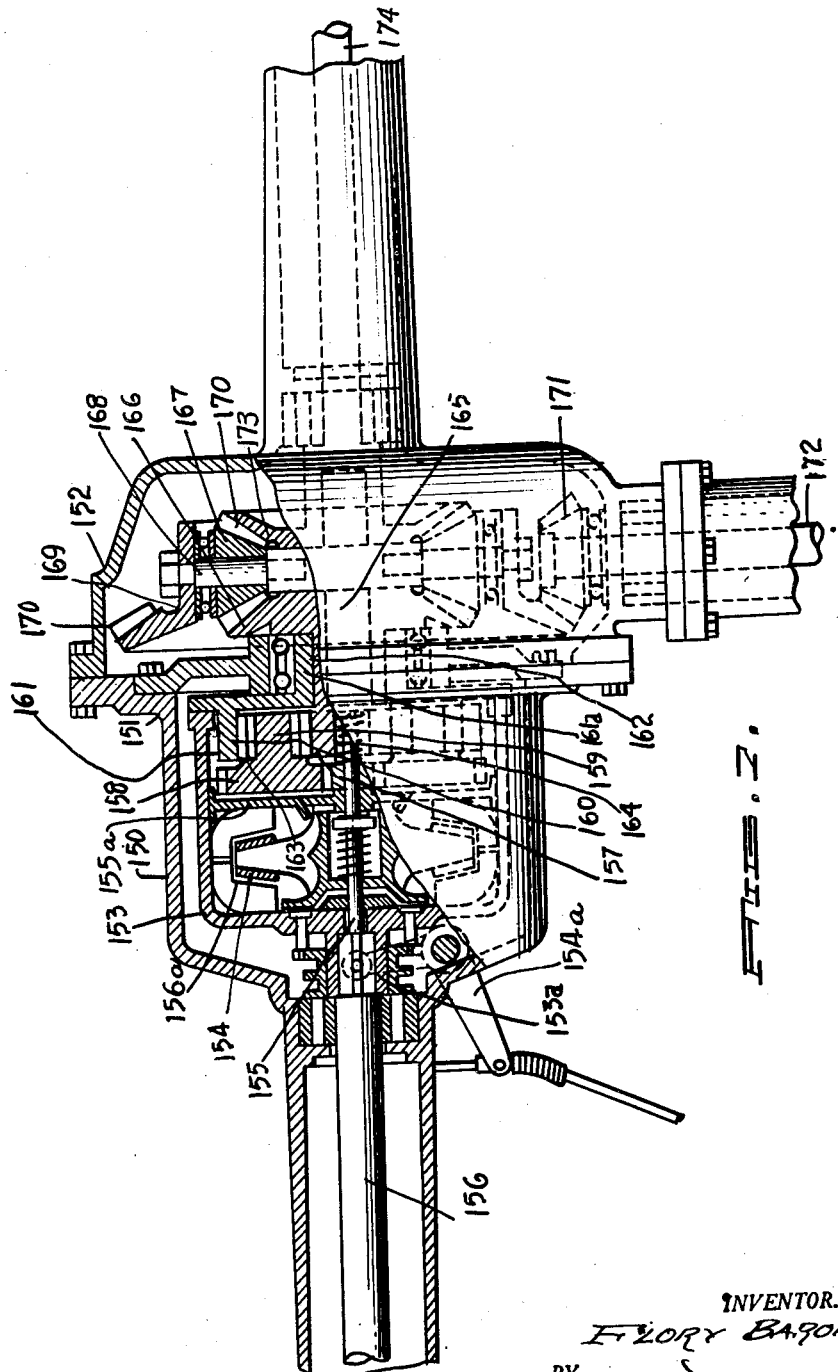

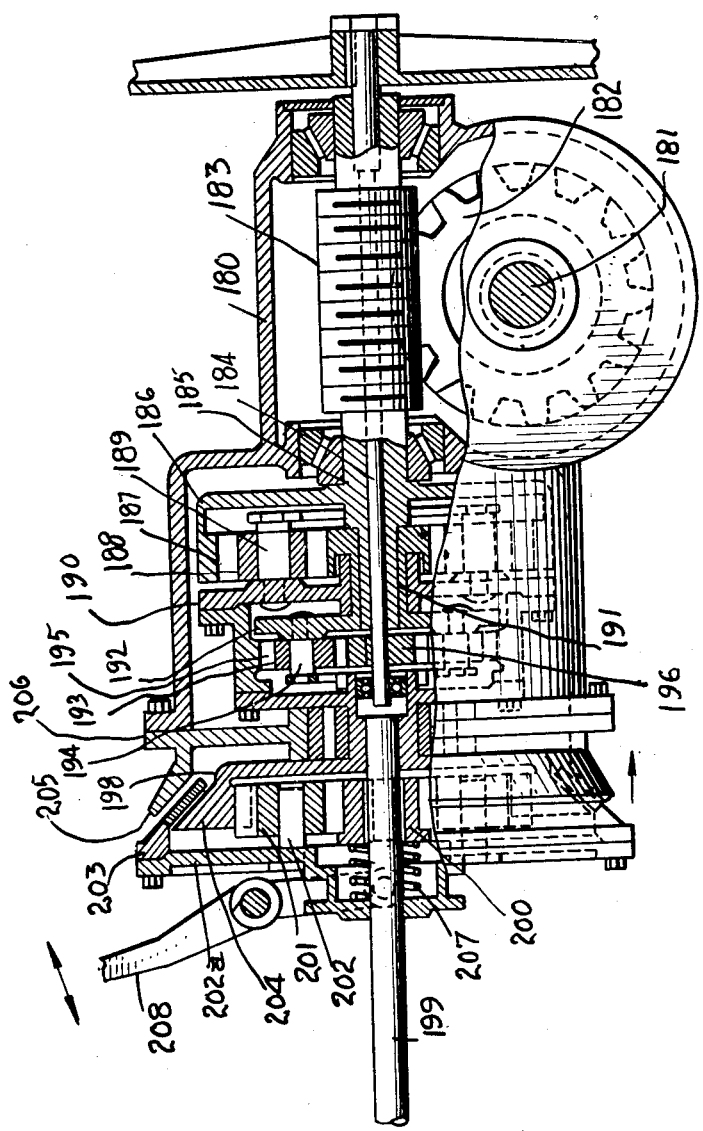

Patented Feb. 14, 1950

2,497,338

UNITED STATES PATENT OFFICE

2,497,338

MEANS FOR AUTOMATICALLY AND PROGRESSIVELY REGULATING VEHICLE SPEED

Flory Baron, Marseille, France, assignor of twenty-five per cent to Leon Mingaud, Long Island City, N. Y.

Application March 13, 1946, Serial No. 654,156
In France April 26, 1945

1 Claim. (Cl. 74—752)

This invention relates to means for regulating the transmission of engine speed to the driving axle of a vehicle, and one of its objects is to transmit mechanically to the driving shaft, the maximum energy, through the medium of different combinations of reducing gears.

Another object of the invention is the provision of a speed regulating means, with double acting devices, whose resistance to rotation increases with the speed of the drive shaft, and which develop a regulative effect on differential mechanism, which will be progressive, continuous and which will operate by the use of a minor fraction of the energy of the prime motor.

A further object of the invention is the provision of means for regulating the speed of transmitted motion, which will include an air compressor delivering its output to the prime motor or internal combustion engine, and automatic means for recovering energy dispersed through the combined system.

With the above and other objects in view, the invention comprises certain new and useful constructions, combinations and arrangements of parts, clearly described in the following specification, and fully illustrated in the drawings, in which:

Fig. 1 is a side elevation of a combined gear mechanism and clutch, and the drive for an air charging compressor, shown partly in section.

Fig. 2 is a side view of an internal combustion engine showing the installation of the combined equipment.

Fig. 3 is a vertical sectional view through a gear mechanism, shown partly in elevation, and including an hydraulic turbine or oil circulating means for dispersing and storing up energy, capable of being partly reabsorbed.

Fig. 4 is a vertical sectional view, partly in side elevation, of another form of the invention, wherein a sliding gear is combined with an air compressor drive.

Fig. 5 is a similar view, showing a multiple planetary gear drive combined with an air compressor drive.

Fig. 6 is a vertical sectional view of a combined planetary gear drive, clutch and brake.

Fig. 7 is a longitudinal sectional view, showing a modified gear drive and an enclosed oil circulating rotor.

Fig. 8 is a longitudinal sectional view of another form of the invention, wherein a worm drive for the vehicle is combined with a planetary gear mechanism and a combined clutch and brake mechanism.

Referring to Fig. 1, 5 designates a gear housing, having an end wall 6, and a main body wall 7. The end wall 6 is formed with a V-shaped circular groove 8, and a detachable end plate 9 is secured to the body wall 7 by means of the bolts 10. The end wall 6 is provided with ball or roller bearings 11, through which the hollow auxiliary shaft 12 extends. The end plate 9 is provided with a bearing 13, axially aligned with the bearings 11, through which the vehicle drive or propeller shaft 14 extends, the two shafts being thus axially aligned.

The end wall 6 carries a series of stud shafts 15, on each of which a sleeve 16 is mounted to turn, and this sleeve is formed with four gears indicated at 17, 18, 19 and 20. The gear 17 has meshing engagement with the small pinion gear 21, keyed to the auxiliary shaft 12. The gears 18 and 20 have meshing engagement with the gears 18a and 20a, keyed to the motor or engine shaft 12. The intermediate gear 19 has meshing engagement with the internal gear 23, carried by the crown cylinder 24, which has an integral end wall 25 on which the bearing 13 is formed.

The auxiliary shaft 12 is tubular and a solid motor shaft 12a extends through the same. On this tubular shaft 12 a pulley wheel 26 is mounted to turn independently of the shaft, and for this purpose rotates in the groove 27 of the auxiliary shaft 12. On the tubular shaft 12 a sleeve 28 is mounted to slide and this sleeve is provided with a clutch flange 29, which is adapted to engage the clutch cone 26a of the pulley wheel 26. A coil spring 30 is disposed between an outer flange 27a of the shaft 12a and an inner shaft 27b of the sleeve 28, to normally hold the clutch flange 29 toward the clutch cone 26a. Suitable means may be provided for shifting the clutch sleeve 28 to cause the two clutch elements to be disengaged, either by hand or foot, or otherwise.

The pulley wheel 26 has driving connection with the flexible belt 31, which drives the pulley wheel 32, of the shaft 33, which turns in the bearings 34 of the housing 35. This shaft carries a helicoidal gear 36, which is engaged by the worm 37 or corresponding helicoidal gear 38, on the shaft 39 of the rotary air compressor or blower 40. This blower has an output tube or pipe 41, which delivers the compressed or blown air to the air intake of the engine, not shown, and in this output tube or pipe a regulating valve 42 is arranged, to operate from remote control, not shown. The groove 8 is engaged by a V-belt 8a, which may exert a blocking action to the housing 5 by tightening the grip between the groove 8 and the belt 8a.

The construction disclosed in Fig. 1 operates in the following manner:

If there is a balance between the driving force and the load the sleeves 16 will not turn on the stud shafts, but will stand still in the driving transmission. However, if the load on the driven shaft 14 increases, the speed of this shaft will slow down and consequently the speed of the crown cylinder 24 will also slow down. Accordingly the sleeve 16 with the gears 17, 18 and 20 will start turning on the stud shafts 15 bringing about a slight retardment between the gears 18a and 20a and the internal gear 23 of the crown cylinder 24. The rotation of the sleeve 16 will produce an acceleration in the speed of the small pinion gear 21 and thereby of the rotor of the compressor 40. The compressor will thus provide a greater feed to the motor increasing the power output.

If, however, the load on the shaft 14 falls off, the sleeves 15 will again turn on the stud shafts 15, however, in the other direction than in the previous case, thereby slowing down the small pinion gear 21 and also the rotor of the compressor 40. Consequently the power output of the motor will fall off and the speed of the motor shaft 12a will be reduced until the speed of the shafts 12a and 14 is balanced again. At that point the sleeves 16 stop turning on the stud shafts 15.

In order to reverse the direction of the vehicle the following steps are taken: The sleeve 28 is moved in axial direction against the force of the spring 30 thereby disconnecting the compressor. Then, the V-belt 8a is tightened in the groove 8 of the wall 6 preventing the rotation of the gear housing 5 and thus the stud shafts 15 are also blocked. In this manner the crown cylinder 24 and thereby the shaft 14 are forced to rotate in reverse direction.

In Fig. 2 I show the application of the improved gear mechanism to an internal combustion engine 43. The shaft 33 is coupled to the armature shaft of the generator 44, to the oil pump 45, the water pump 46, and is equipped with an air fan or screw 47.

In Fig. 3 I show a gear housing 50, having an end wall 51, formed with a part housing 52 for the oil circulating rotor 53. The end wall 51 is formed with a circular V-groove 54, which is engaged by the band or belt 55 for the purpose of blocking the housing 50 against rotation. A companion housing part 56 is bolted to the housing part or section 52 by the bolts 57. The rotor 53 is mounted to turn on the sleeve shaft 58, carried by the motor shaft 59. The end wall 51 is formed with a bearing (not shown) through which the sleeve shaft 58 and the motor shaft 59 extend.

This end wall 51 also carries a series of stud shafts 60, on which the sleeves 61 are mounted to freely turn. Each sleeve is formed with four gears 62, 63, 64 and 65. The gear 62 meshes with the gear pinion 62a of the sleeve shaft 58, the gears 63 and 65 mesh with the gears 63a and 65a of the motor shaft 59. The gear 64 meshes with the internal gear ring 66, carried by the crown cylinder 67, which is formed with an integral hub 68 providing a connection to the vehicle drive shaft 69. The auxiliary sleeve shaft 58 rotates freely on the motor shaft 59.

The oil rotor 53 is provided with an internal clutch cone 53a, which is engaged by the clutch cone 70 of the sleeve 71, which slides on the sleeve shaft 58. A coil spring 72 is disposed between the housing section hub 56a and the clutch cone 70. A spanner collar 73 is connected or formed integral with the sliding clutch sleeve 71, and engaged by the lever arm 74, so that the clutch may be manually released.

The gear mechanism shown in Fig. 3 operates in the same manner as described in the operation of the construction shown in Fig. 1. The regulator, however, comprises a hydraulic turbine. The rotor 53 of the turbine feeds a fluid, preferably oil on the blades provided in the interior of the rotor which is integral with the gear housing 50. By this arrangement the mechanical action of differential pinions is linked to the action of a regulator deducting a part (5 to 25%) of the driving power to assure the progressive variation of the demultiplication ratios of the differential gears.

In Fig. 4 I show another form of the invention, wherein the gear housing 80 is provided with a bearing 81 for the vehicle drive shaft 82. this shaft is aligned axially with the engine transfer shaft 83, which carries the sleeve 84. This sleeve is formed or provided with a gear 85, which meshes with the gear 86, carried by the main engine shaft 87. The gear 86 has a sliding spline connection with the main engine shaft 87, and is shifted by means of the shifter rod 88, which is provided with the usual shifter fork or arm 89 to engage the gear 86. This gear 86 carries a smaller gear 86a which does not mesh with the gear 85 of the sleeve 84, but can be moved into meshing engagement with the internal gear 90 of the ring 91, which is formed integral with the sleeve 84.

The outer end of the transfer shaft 83 has a bearing at 83a on the housing section 92, and is equipped with a helicoidal gear 93, which engages the smaller helicoidal gear 94, on the cross shaft 95, of the rotor or fan of the air compressor 96, which is provided with an output tube or pipe 97 for delivering air under pressure to the engine intake. A manually operated valve 98 is arranged in this output tube or pipe.

The ring 91 is equipped with a plurality of stud shafts 91a. The latter carry gears 92a which mesh the internal gears 93a of the crown 94a and at the same time the regulator pinion 95a which is connected with the transfer shaft 83 by means of the clutch device 96a. The crown 94a is keyed to the vehicle drive shaft 82 and the transfer shaft 83 rotates freely in the sleeve 84. The shaft 83 puts into action either an air compressor or a regulator apparatus as disclosed in Fig. 2 or a rotor of a mydraulic turbine as disclosed in Fig. 4. The action of the regulator pinion 95a controls the rotation of the gears 92a and thereby the speed of the crown 94a and consequently of the shaft 82.

Thus, the construction shown in Fig. 4 operates as a rotation reverser of the propeller shaft. The reversing will be achieved by sliding the gears 86 and 86a towards the ring 91 disengaging the gear 85 which operates for forward driving and then meshing the gear 86a with the internal gear 90 of the ring 91. This shifting of the gears 86 and 86a may be performed by foot or hand by means of the shifter rod 88 which carries the shifter fork 89.

In Fig. 5 I show a housing 100, having end bearings 101 and 102. The shaft 103 extends through bearings 101 and the shaft 103a extends through bearings 102. On one end portion of the shaft 103 the ring 104 is keyed, and this ring carries a series of radial stud shafts 105, on each one a bevel gear 106 being mounted to turn. These bevel gears engage the large disc bevel gear 107, which is keyed to the shaft 103a and turns with the shaft 103a against the thrust bearing 108. The bevel gears 106 also engage the larger gear 109 on the ring frame 110 which turns freely on shaft 103a, and this ring frame carries a series of stud shafts 111, and on each of these shafts a bevel gear 112 is mounted to turn. The bevel gears 112 simultaneously engage the bevel disc gear 113, which is keyed to the shaft 103a, and the ring gear 114, which turns on the shaft 103a. The ring gear 114 carries a series of radial stud shafts 115, and on each of these shafts a bevel gear 116 is mounted to turn. The bevel gears 116 simultaneously engage the disc gears 117 and 118, the disc gear 117 being keyed to the shaft 103a and the disc gear 118 turning freely thereon. The disc gear 118 is formed integral with the sleeve 120, which turns on the shaft 103a, and on this sleeve the helicoidal gear 121 is formed or secured, and this helicoidal gear has driving engagement with the helicoidal gear 121a of the blower shaft 122, which operates the rotor of the air blower 123, the output pipe 124 of which is provided with an internal valve 125.

The embodiment shown in Fig. 5 is designed with a view for obtaining greater speed of the regulator-compressor giving the best output for the different uses, at the same time reducing to a minimum the dispersed power by this regulating apparatus.

If it is assumed that there is a balance between the motor power and the load, the shaft 103a will be driven at the same speed as the motor shaft 103, the bevel gears 106, 112, and 116 will not turn and the compressor will operate at moderate speed.

If, however, the load on the shaft 103a increases, the latter will have the tendency to slow down and thereby also the bevel gears 107, 113, and 117. Consequently the bevel gears 106, 112, and 116 will turn on the respective stud shafts 105, 111, and 115, thereby increasing the speed of the ring frame 107. The latter drives the ring frame 110, stud shaft 111, and bevel gear 112. The speed of the freely turning bevel gear 114 will be doubled compared with that of the previous bevel gear and at the same time the bevel gear 114 will operate the stud shaft 115 and the bevel gear 116, which will double again its speed, and finally the movement is transferred to the disk gear 118. The latter drives the rotor of the air blower 123 as stated above. In this manner it is possible to obtain a transmission at variable speed and particularly on the shaft 103a carrying the load, exceeding ⅞ of the motor power and whatever the driving speed of the shaft 103a the last ⅛, minus losses due to friction, is absorbed by the compressor which, by precompressing the feeding gases of the motor, brings back the greatest part of the dispersed energy to the motor.

Yet, if the load on the shaft 103a diminishes, the same action as described above takes place, however, in reverse direction. In this case it is even possible that the shaft 103 turns at greater speed than that of the shaft 103a.

In Fig. 6 I show a combined planetary gear drive and a cone clutch assembly, which includes the stationary element 130, which is formed with an internal clutch cone or brake cone 131, which is engaged by the sliding clutch and brake cone 132, which is mounted to slide on the shaft 133, against the spring 134. The end wall 135 of the clutch element or cone 132 is equipped with stud shafts 136, which carry the spur gears 137, which simultaneously engage the gear 138 on the inner end of the shaft 133, and the internal gear 139 of the ring 140, which is mounted to turn with the driven vehicle shaft 141, and which carries a clutch cone 142, which may be engaged by the clutch cone 132. When the clutch and brake cone 132 is engaged with the clutch cone 142 the two shafts 133 and 141 will be coupled in driving engagement, and when the clutch and brake cone 132 engages the fixed cone 131 a braking action will develop, which will be transmitted through the gear train, which is of a planetary type, to the shaft 141.

The arrangement shown in Fig. 6 represents an apparatus for reversing the drive, as for instance, in connection with the embodiment shown in Fig. 5. This apparatus is based on the principle of providing a group of planetary pinions combined with a clutch and brake, the latter rendering immovable the intermediate pinions.

Thus, driving forward is obtained by normal engagement of the clutch and brake cone 132 with the clutch cone 142, thereby blocking the spur gears 137 by means of the internal gear 139 of the ring 140, which thereby also blocks the gear 138. Shaft 141, therefore, turns in the same direction as shaft 133. Yet, if the clutch and brake cone 132 is engaged with the brake cone 131, the spur gears 137 are free to rotate on the stud shafts 136 and the shaft 141 will turn in opposite direction to that of the shaft 133.

Fig. 7 shows a differential speed variator in connection with the rear or front axle of an automobile. According to the arrangement the conventional differential of a rear axle is combined with complementary differential gears together with a regulator as a hydraulic turbine disclosed in Fig. 3.

The motor shaft 172 turns the bevel gear 170 by means of the bevel pinion gear 171. The bevel gear 170, which is centered by its axle 165 carries the stud shafts 168 on which the bevel gears 167 turn. The bevel gears 167 mesh both bevel disc gears 166 and 170, the bevel disc gear 170 being keyed to the shaft 174 of one of the wheels. The bevel disc gear 166 drives the shaft 156 of the other wheel through the speed variator. The latter comprises a pinion gear 157 which meshes the pinion spur gears 159. The latter mesh also the internal gear of the ring 161 which is connected or integral with the inner housing 153 and the latter is keyed to the shaft 156 which drives the other wheel (not shown). The spur gears 159 carry another gear 158 of larger diameter which gear 158 meshes the pinion gear 157 of the regulator which comprises the rotor 154. The latter is keyed to the shaft 155 and the rotor 28 may be connected to the shaft 156 by means of the clutch 154a. The shaft 155 passes through the partition wall 155a which forms together with the inner housing the oil case. In this case the blades 156a are provided. The rotor 154 projects the liquid tangentially towards the blades 156a and thus turns the wheel.

The apparatus operates basically in the same manner as described with the construction shown in Fig. 3, however, with the difference that a first differential balance will come about between the bevel disc gears 166 and 170 by means of the bevel gears 167 which are driven by the engine shaft 172 over the gears 170 and 171.

An outer housing 180 protects the regulator as well as the different gears and supports all necessary bearings, lubricating means and the clutch arrangement 154a.

In Fig 8 I show a housing 180, in which the cross shaft 181 is mounted to turn, and which has suitable driving engagement with the traction road wheels of the vehicle, as by a front or rear axle, mounted to turn in its bearings. This cross shaft 181 is equipped with a helicoidal gear 182, and with the usual differential, not shown. The helicoidal gear 182 is engaged by the helicoidal gear 183 on the hollow shaft 185. This shaft forms integral a ring 186, which is formed with an internal ring 187, engaged by the planetary spur gears 188, which turn on the stud shafts 189, carried by the disc 190, which turns on the sleeve 191, which turns on the hollow shaft 185. The sleeve 191 is attached to the disc 192, which carries the spur gears 193 on the stud shafts 194, which simultaneously engage the internal gear ring 195 and the pinion gear 196, which is keyed to the regulating shaft 184 extending through the hollow shaft 185. The ring gear 198 is mounted on the inner end of the shaft 199, and turns relative thereto. The shaft 199 has a pinion gear 200 splined thereto, which is engaged by the planetary spur gears 201, mounted to turn on the stud shafts 202, carried by the end plate 202a of the housing. This end plate is equipped with a clutch and brake cone 203 which is adapted to have clutching engagement with the clutch cone 204, of the internal gear ring 198, and is also adapted to have braking action with the internal cone 205, formed on the end plate 206 of the housing 180.

The end plate 202a slides on the shaft 199 against the coil spring 207, and is shifted by means of the shifter lever 208.

The construction shown in Fig. 8 will operate in the following manner: The motor shaft 199 drives the first differential unit and depending upon the position of the clutch and brake cone 203 the wheels are driven in forward or backward direction. This motion is transferred over the two sets of differential gears provided in the housing 180 to the helicoidal gear 183 and over the gear 182 to the cross shaft 181 carrying the wheels (not shown).

In the constructions shown in Figs. 1, 2, 4 and 5, a rotary air compressor is coupled with the speed varying mechanism to absorb the energy of the transmission shaft, and thus the load of the vehicle controls the feeding of air to the engine.

In the constructions shown in Figs. 3 and 7, this conversion of shaft energy is made by circulating oil under the force of a rotary turbine or circulator, which is directly coupled to the speed regulating transmission mechanism.

In the construction shown in Figs. 6 and 8 the transmission of energy from the engine shaft to the driven vehicle shaft is made through planetary gear mechanism, a manually or automatically shifted clutch mechanism, which couples the planetary gear mechanism.

In each of these forms the transmission of energy from the main engine shaft to the driven vehicle shaft is accomplished by the dispersion of energy through an intermediate mechanism or work absorbing unit, and this unit performs the useful function of returning to the main drive shaft line some of the energy which it absorbs or stores up, so as to aid the work line in service when the load impressed upon it calls for the application of increased energy.

It is understood that various changes in the details of construction, their combination and arrangement, may be made, within the scope of the invention, defined by the claim hereof.

Having described the invention I claim as new:

In a transmisison, a driving shaft, a driven shaft, and a hollow auxiliary shaft turning freely on the driving shaft, a first pinion keyed to the auxiliary shaft, at least one second pinion keyed to the driving shaft, a housing, turnably mounted on the auxiliary shaft, means for blocking the housing against rotation, a plurality of stud shafts extending in axial direction secured to the housing, a sleeve freely turning on each of said stud shafts, at least three gears on said sleeve, a crown member having an internal gear in said housing, said crown being connected with the driven shaft, one of the three gears of the sleeve meshing the pinion of the driving shaft, a second one of the three gears meshing the pinion of the auxiliary shaft and the third of the three gears meshing with the internal gear of the crown.

FLORY BARON.

REFERENCES CITED

The following references are of record in the file of this patent:

UNITED STATES PATENTS

| Number | Name | Date |
|---|---|---|
| 721,624 | Tregurtha | Feb. 24, 1903 |
| 1,203,265 | Radcliffe | Oct. 31, 1916 |
| 1,242,974 | Pinckney | Oct. 16, 1917 |
| 1,377,377 | Wheeler | May 10, 1921 |
| 1,388,324 | Carr | Aug. 23, 1921 |
| 1,473,487 | McCarthy | Nov. 6, 1923 |
| 1,732,405 | Invernizzi | Oct. 22, 1929 |
| 1,764,849 | O'Connor | June 17, 1930 |
| 2,091,356 | Fawcett | Aug. 31, 1937 |
| 2,235,370 | Jandasek | Mar. 18, 1941 |
| 2,372,883 | Daub | Apr. 3, 1945 |

FOREIGN PATENTS

| Number | Country | Date |
|---|---|---|
| 287,595 | Great Britain | Mar. 29, 1928 |